US012762588B2

(12) United States Patent
Mookherjee et al.

(10) Patent No.: US 12,762,588 B2
(45) Date of Patent: Oct. 13, 2026

(54) CONTENT FOR TARGETED TRANSMISSION

(71) Applicant: NBCUniversal Media, LLC, New York, NY (US)

(72) Inventors: Reetabrata Mookherjee, Costa Mesa, CA (US); Leonard Anghelescu, Long Beach, CA (US); Kailai Zhou, Los Angeles, CA (US); Indraneel Sheorey, Sherman Oaks, CA (US); Mike Murano, Los Angeles, CA (US); Liang Xu, Aliso Viejo, CA (US); Jonathan Sudhakar, Irvine, CA (US); Robert Leff, Westlake Village, CA (US); Paul Yanover, Los Angeles, CA (US)

(73) Assignee: NBCUNIVERSAL MEDIA, LLC, New York, NY (US)

( * ) Notice: Subject to any disclaimer, the term of this patent is extended or adjusted under 35 U.S.C. 154(b) by 0 days.

(21) Appl. No.: 18/624,899

(22) Filed: Apr. 2, 2024

(65) Prior Publication Data

US 2024/0249316 A1 Jul. 25, 2024

Related U.S. Application Data

(62) Division of application No. 15/962,762, filed on Apr. 25, 2018, now abandoned.

(51) Int. Cl.
*G06Q 30/0251* (2023.01)
*G06F 15/76* (2006.01)
(Continued)

(52) U.S. Cl.
CPC ......... *G06Q 30/0254* (2013.01); *G06F 15/76* (2013.01); *G06F 16/951* (2019.01); *G06N 20/00* (2019.01); *G06Q 30/0256* (2013.01)

(58) Field of Classification Search
None
See application file for complete search history.

(56) References Cited

U.S. PATENT DOCUMENTS 7,853,622 B1 12/2010 Baluja
8,341,169 B2 12/2012 Nance
(Continued)

OTHER PUBLICATIONS

A. Bulut, "TopicMachine: Conversion Prediction in Search Advertising Using Latent Topic Models,"in IEEE Transactions on Knowledge and Data Engineering, vol. 26, No. 11, pp. 2846-2858, Nov. 1, 2014, doi: 10.1109/TKDE.2014.2313868. (Year: 2014).
(Continued)

*Primary Examiner* — Dipen M Patel
(74) *Attorney, Agent, or Firm* — Fletcher Yoder, P.C.

(57) ABSTRACT

Machine readable instructions for providing targeted advertisements for a piece of digital content receive a set of user metadata for a group of users. The machine readable instructions select at least one user from the group of users. In addition, the machine readable instructions select a term from a category of terms related to the piece of digital content. Moreover, the machine readable instructions determine a first value corresponding to the at least one user. Also, the machine readable instructions determine a second for the group of users. In addition, the machine readable instructions determine a user score based at least in part on the first value and the second value. When the user score is within a particular range, the machine readable instructions provide an advertisement for the piece of digital content to an electronic device associated with the at least one user.

18 Claims, 8 Drawing Sheets

(51) Int. Cl.
*G06F 16/951* (2019.01)
*G06N 20/00* (2019.01)

(56) References Cited

U.S. PATENT DOCUMENTS

| | | | | |
|---|---|---|---|---|
| 8,707,157 | B1 | 4/2014 | Chouhan | |
| 2008/0294607 | A1 | 11/2008 | Partovi | |
| 2009/0112701 | A1 * | 4/2009 | Turpin | G06Q 30/0239 705/7.33 |
| 2009/0234727 | A1 | 9/2009 | Petty | |
| 2012/0066073 | A1 | 3/2012 | Dilip | |
| 2012/0197733 | A1 | 8/2012 | Skomoroch | |
| 2012/0290950 | A1 | 11/2012 | Rapaport | |
| 2012/0317123 | A1 | 12/2012 | Green | |
| 2013/0103609 | A1 | 4/2013 | Kirshenbaum | |
| 2014/0236953 | A1 * | 8/2014 | Rapaport | G06F 16/285 707/740 |
| 2014/0258400 | A1 | 9/2014 | Paritosh | |
| 2014/0279202 | A1 | 9/2014 | Egozi | |
| 2015/0006286 | A1 | 1/2015 | Liu | |
| 2016/0071162 | A1 | 3/2016 | Ogawa | |
| 2016/0080404 | A1 * | 3/2016 | Kohout | H04L 63/20 726/23 |
| 2016/0180388 | A1 | 6/2016 | Koran | |
| 2018/0047060 | A1 | 2/2018 | Jeon | |
| 2019/0043070 | A1 * | 2/2019 | Merrill | G06Q 30/0205 |

OTHER PUBLICATIONS

Bhattacharyya, P et al.; Analysis of User Keyword Similarity in Online Social Networks; Soc. Netw. Anal. Min. 1; 143-158; 2011; https://doi.org/10/1007/s13278-010-0006-4; (Year: 2011).

Y. Lu et al., "Integrating Predictive Analytics and Social Media," 2014 IEEE Conference on Visual Analytics Science and Technology (VAST), 2014, pp. 192-202, doi: 10.1109/VAST.2014.7042495. (Year: 2014).

P. Carbone and V. Vlassov, "Auto-Scoring of Personalised News in the Real-Time Web: Challenges, Overview and Evaluation of the State-of-the-Art Solutions," 2015 International Conference on Cloud and Autonomic Computing, 2015, pp. 169-180, doi: 10.1109/ICCAC2015.9 (Year: 2015).

Q. Ma, et al.; "Score Look-Alike Audiences," 2016 IEEE 16th International Conference on Data Mining Workshops (ICDMW), 2016, p. 647-654, doi: 10.1109/ICDMW.2016.0097. (Year: 2016).

B. Bhattacharya et al., "Intent-Aware Contextual Recommendation System,"; 2017 IEEE International Conference on Data Mining Workshops (ICDMW), 2017, pp. 1-8, doi: 10.1109/ICDMW.2017.8. (Year: 2017).

* cited by examiner

CONTENT FOR TARGETED TRANSMISSION

CROSS REFERENCE TO RELATED APPLICATIONS

This application is a divisional of and claims priority to U.S. patent application Ser. No. 15/962,762, entitled "CONTENT FOR TARGETED TRANSMISSION," filed Apr. 25, 2018, which is herein incorporated by reference in its entirety for all purposes.

BACKGROUND

The present disclosure relates generally to targeted transmission of particular content to users. For example, the content may include information (e.g., advertisements) targeted to users based on consumer data and other information.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Digital content is often produced and distributed at high costs. As such, digital content producers engage in campaigns to promote sales of the digital content. Because it is difficult to target campaigns to consumers who are most likely to be swayed by the campaigns, these campaigns have typically been broad and costly. To reduce the scope and costs of such campaigns, producers of digital content attempt to collect and leverage additional consumer data to identify particular segments of consumers that would most likely be swayed by targeted advertising. The availability of consumer data has increased because consumers frequently use personal devices such as computers, smart phones, televisions, personal assistant devices, etc. to consume digital content and provide feedback, which helps advertisers identify consumer preferences and tendencies. However, the amount of data produced by consumers is very large and overwhelming for current systems and methods to provide targeted content, such as advertisements. Accordingly, a need exists to develop algorithms that effectively utilize and process consumer data in an efficient manner to identify an appropriate audience for targeted content (e.g., advertising content).

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with an embodiment of the present disclosure, a tangible, non-transitory machine readable medium comprising machine readable instructions for providing targeted advertisements for a piece of digital content, when executed by one or more processors cause the one or more processors to receive a set of user metadata for a group of users. The metadata includes data relating to user browsing history, purchase history, term usage history, social media posts and actions, location information, or a combination thereof. The machine readable instructions also identify a subset of users of the group of users, the subset of users share a common attribute found in the set of user metadata. Further, the machine readable instructions select at least one user from the group of users. In addition, the machine readable instructions select a term from a category of terms related to the piece of digital content. Moreover, the machine readable instructions determine a first value by comparing a first total of appearances of the term and a second total of appearances of all terms from the category of terms within the set of user metadata corresponding to the at least one user. Also, the machine readable instructions determine a second value for the subset of users by determining a portion of users of the subset of users for which the term appears in the set of user metadata corresponding to the subset of users. In addition, the machine readable instructions determine a user score based at least in part on the first value and the second value. Further, when the user score is within a particular predetermined range, the machine readable instructions provide an advertisement for the piece of digital content to one or more electronic devices associated with the at least one user.

In accordance with another embodiment of the present disclosure, a method for providing targeted advertisements for a piece of digital content includes receiving a set of user metadata for a group of users. The metadata includes data relating to user browsing history, purchase history, term usage history, social media posts and actions, location information, demographic information, or a combination thereof. The method also includes identifying a subset of users of the group of users, the subset of users share a common attribute found in the set of user metadata. Further, the method includes selecting at least one user from the group of users. Moreover, the method includes selecting a plurality of terms from a category of terms related to the piece of digital content. In addition, the method includes, determining a plurality of first values, each of the plurality of first values is determined by comparing a first total of appearances of each term of the plurality of terms and a second total of appearances of all terms from the category of terms within the set of user metadata corresponding to the at least one user. Also, the method includes determining a plurality of second values for the subset of users by determining a portion of users of the subset of users for which each term of the plurality of terms appears in the set of user metadata corresponding to the subset of users. Moreover, the method includes determining a user score based at least in part on the plurality of first values and the plurality of second values. Also, when the user score is within a particular predetermined range, the method includes providing an advertisement for the piece of digital content to one or more electronic devices associated with the at least one user.

In accordance with another embodiment of the present disclosure, a cloud services system includes affinity prediction logic, configured to receive a set of user metadata for a group of users. The metadata includes data relating to user browsing history, purchase history, term usage history, social media posts and actions, location information, or a combination thereof. Further, the affinity prediction logic is configured to identify cohort(s)/group(s) in which a user resides (e.g., a subset of users of the group of users that is based upon one or more common attributes found in the set of user metadata). Also, affinity prediction logic is configured to select at least one user from the group of users. Moreover, the affinity prediction logic is configured to select a term from a category of terms related to the piece of digital content (e.g., based upon metadata of the digital content). In addition, the affinity prediction logic is configured to compare a first total number of appearances of the term for a user and a second total number of appearances of all terms from the category of terms within the set of user metadata corresponding to the at least one user. Also, the affinity prediction logic is configured to determine, for the subset of users (e.g., the pre-determined cohort(s)/group(s)), a number of users of the cohort(s) for which the term appears in the set of user metadata corresponding to the cohort(s).

Moreover, the affinity prediction logic is configured to determine a first user score based at least in part on the first value and the second value. The first user score may provide an indication of whether the user would likely be swayed by targeting advertising and may be used to determine whether the user should be included as part of a target audience for the content.

The cloud services system also includes machine learning logic configured to convert the set of user metadata into a set of features. Moreover, the machine learning logic may be configured to determine an interaction between a first feature of the set of features and a second feature of the set of features. Further, the machine learning logic may determine a user score based at least in part on this interaction. In addition, the cloud services system include presentation logic configured to provide targeted content associated with the piece of digital content to one or more electronic devices associated with the at least one user when the user score is within a predetermined range.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As set forth above, it is now recognized that traditional targeted advertising approaches are often too broad in scope, causing associated costs to increase. The present disclosure provides, among other things, methods, techniques, products, and systems for analyzing consumer data in order to provide targeted content (e.g., advertisements) to users in an efficient and accurate manner. By way of non-limiting example, the present disclosure includes methods that include receiving large volumes of user data and analyzing the user data through the use of machine learning systems, affinity analysis, or both to determine which users are mostly likely to respond to, and therefore, should receive a targeted advertisement.

Figure 1:
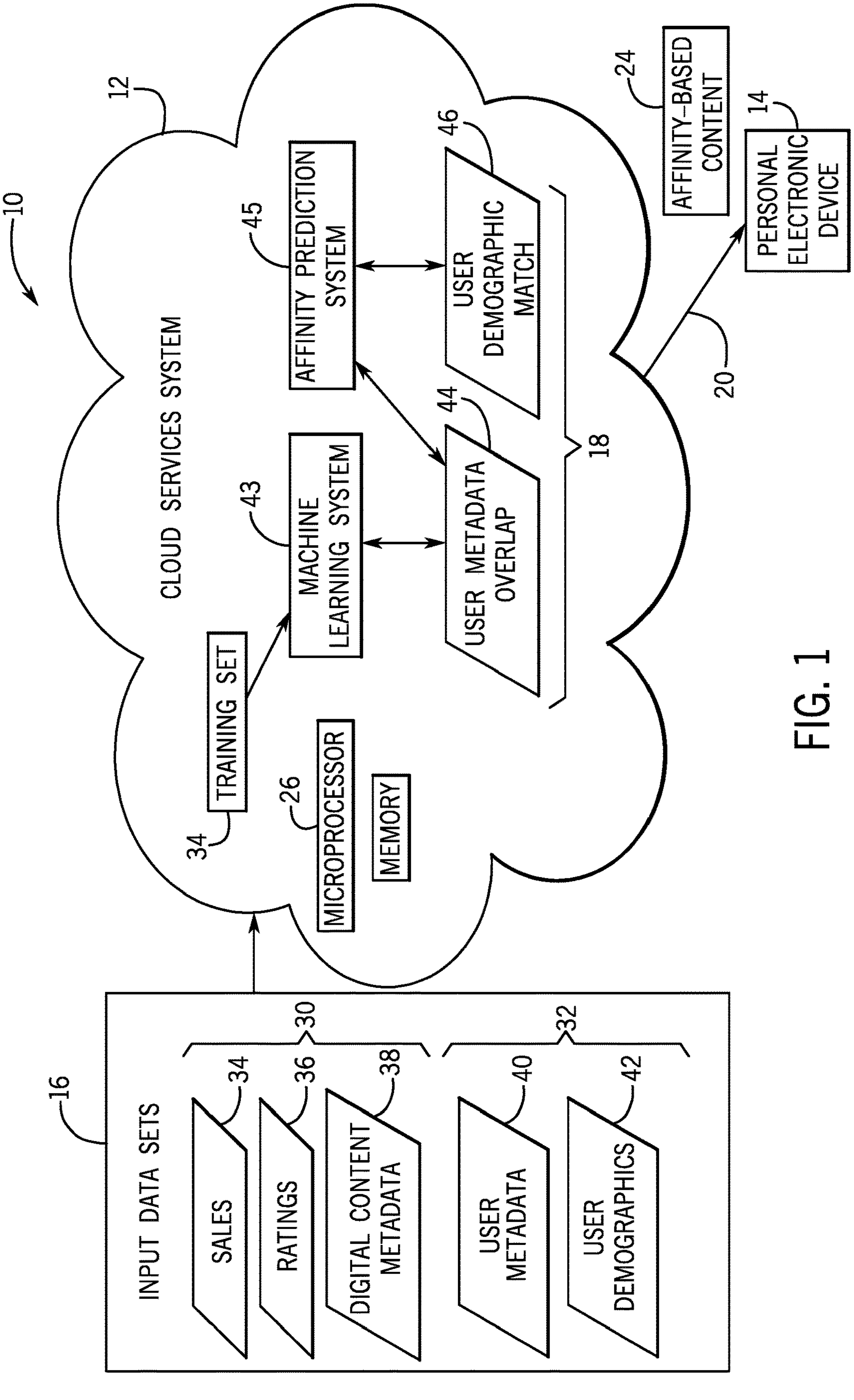
FIG. 1 is a schematic diagram of a targeted content delivery system utilized to provide targeted advertisements, in accordance with an embodiment of the present disclosure.

FIG. 1 is a diagrammatical representation of an exemplary targeted content generation system 10 having a cloud based services system 12 communicatively coupled with a personal device 14. The personal device 14 may include a smart-phone, a computer, a tablet or a hand-held computer, a laptop, a conventional or High Dynamic Range (HDR) television set associated with a processing system (e.g., cable, satellite or set-top box), conventional or HDR television sets configured or communicatively coupled to the Internet, and/or another personalized computing device. The cloud based services system 12 may be utilized to receive an input data set 16 and utilize the input data set 16 to produce an intermediate data set 18 and an output data set 20. The output data set 20 may be sent to the personal device 14, and may include data to be displayed on the personal device 14. For example, the output data set 20 may include affinity-based digital content (e.g., television show, movie, music, advertisements, etc.) 24 to be displayed on the personal device 14. The cloud based services system 12 may include one or more processors 26, and associated memory 28 for receiving and processing the input data set 16 and the intermediate data set 18, and outputting the output data set 20.

The input data set 16 is received by the cloud based services system 12 and is utilized to produce the intermediate data set 18. Further, the intermediate data set 18 may be utilized in conjunction with the input data set 16 to produce the output data set 20. The input data set 16 may relate to generalized groups of data, such as a digital content input data set 30 and a user input data set 32. The digital content input data set 30 may include data for a particular piece of digital content. For example, the digital content input data set 30 may include data such as sales data 34, ratings data 36, metadata 38 such as genre (e.g., science fiction, action, romance, etc.), names of directors, names of actors, names of production studios, names of composers, budgets (e.g., production budget) or any other data relating to a particular piece of digital content. Further, the sales data 34 may include sales data for pre-sales, projected sales, actual sales, etc. The ratings data 36 may include ratings from professional critics, user scores, user anticipation ratings, etc.

The user input data set 32 may include user metadata 40 (e.g., websites visited, frequency of visitation, duration of visitation, click through rate, digital content purchase history, comment history such as terms used, frequency of terms used, timestamps of term usage, etc.) and user demographic data 42 (e.g., race, age, gender, religion, etc.). Further, it should be appreciated that the user input data set 32 may relate to an individual user, a group of users, or both.

The user input data set 32 may be generated through tracking users' digital interactions while using smart-phone applications or websites such as Fandango or Rotten Tomatoes. Specifically, these interactions such as purchases, trailer views, look up of show times, checking amenities of an auditorium or movie theater, etc., may be inferred from several data sets generated by various digital platforms (e.g., digital platforms owned by Fandango). A holistic set of interactions with purchase intent may be inferred from several sources, such as 1) a set of online ticketing transactions (e.g., via Fandango, Flixster, MovieTickets.com, etc.); 2) Rotten Tomatoes audience reviews within the imputed theatrical window of movie; 3) subscriptions services, such as Fandango Fan Alert and Favorite Movie Subscribers, etc.; 4) Offline services that provide ticking transactions (e.g., provision from a Box Office). This union of all sales signals provides a comprehensive set of interactional data that can be gathered within a movie services ecosystem. Further, the user input data set 32 may be acquired from third parties that collect user data, such as: demographics data, and social interaction and intent data, etc.

After receiving the input data set 16, the cloud based services system 12 may produce an intermediate data set 18 for further analysis purposes. The cloud services system 12 may include a machine learning system 43 and an affinity-based prediction system 45 to analyze the input data set 16. For example, the machine learning system 16 may receive the input data set 16 and a training data set 47 that includes user metadata and actual results (e.g., purchases) of the users. The machine learning system 43 may utilize the input data set 16 to determine how likely a user is to be interested in a particular piece of digital content based on similarities between the user input data set 32 and the training data set 47. The likelihood that a user is interested in a particular piece of digital content may be represented by user metadata overlap data 44, which may provide an indication in overlap between metadata in content versus metadata of content the user has previously interacted with.

The affinity-based prediction system 45 receives the input data set 16 and determines the number of times a single user uses or exhibits a single term. The affinity-based prediction system 45 then determines the number of times an associated group of users uses or exhibits the same term per user. Then, the affinity-based prediction system 45 compares the number of times the single user used the term compared to the number of times the group of users used the term. If the term is over indexed for the single user in comparison to the group of users, then the single user is likely to be more interested in the term and digital content associated with that term. Based on the user affinity for the term, the user metadata overlap data 44 is determined. For example, if the user's metadata includes an over indexing of the term "Actor X", the user's affinity for Actor X's content may be high. Further, the user demographic data 42 relating to the single user found to be likely interested in a particular piece of digital content may be utilized to find additional user demographic matching data 46. The user demographic matching data 46 may be utilized to pre-select users to be further analyzed by the cloud services system 12. Pre-selecting users may reduce the total number of users analyzed by the cloud services system 12.

For example, the intermediate data set 18 may include user metadata overlap data 44 that relates to the likelihood that a particular user would be interested in consuming a particular piece of digital content. For example, if a particular user is determined to be very unlikely to consume a particular piece of digital content, then the cloud based services system 12 (e.g., via the machine learning system 43, the prediction system 45, or both) may determine that the particular user should not receive the targeted content, as targeted content would likely not persuade the user to interact with the digital content. Conversely, if a particular user is determined to be very likely to consume a particular piece of digital content, then the cloud based services system 12 may determine that the particular user should not receive the targeted content, as the user will likely consume the particular piece of digital content regardless of receiving the targeted content. However, when it is determined that a user is somewhere between being very likely and very unlikely to consume the particular piece of digital content, the cloud based services system 123 may determine that the particular user should receive the targeted content.

Figure 2A:
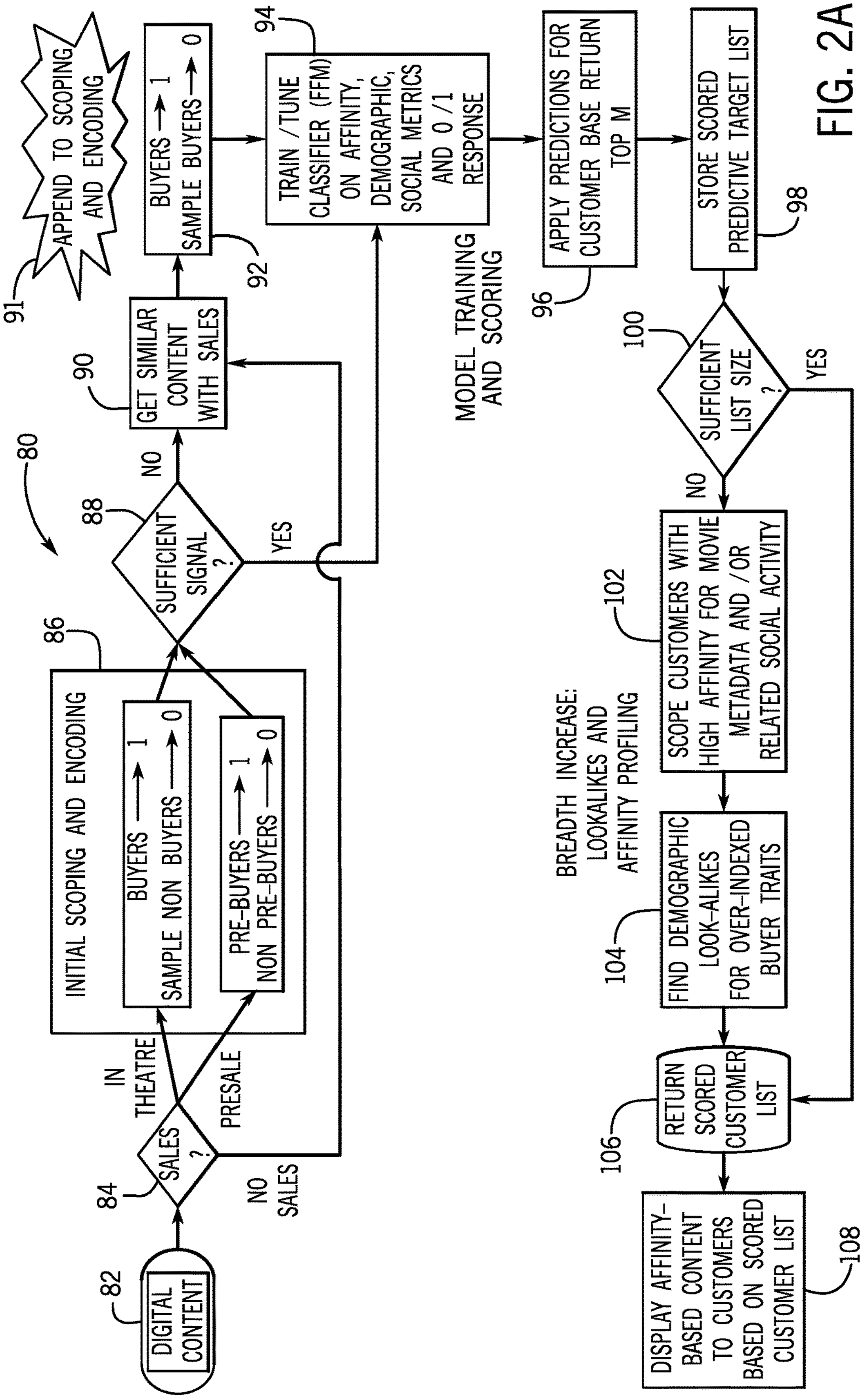
FIG. 2A is a process flow diagram illustrating a manner in which the targeted content delivery system of FIG. 1 determines whether targeted content is provided to a user and which targeted content should be provided to the user, in accordance with an embodiment of the present disclosure.

FIG. 2A is a process flow diagram illustrating a manner in which the targeted content system 10 determines whether targeted content should be provided to a user and which targeted content should be provided to the user. In particular, the process 80 begins with a piece of digital content 82. For example, the digital content 82 may be a piece of digital content for which the producer of the digital content 82 wants to run or purchase advertisements for provision to a targeted audience.

Then, the process 80 determines whether there is any sales data 84 for the digital content 82. In the present embodiment, the three options for sales data may include presale data (sales made before a movie is available in theaters), in theater sale data (sales made when a movie is available in theaters), and no sale data. The sales data may be collected through movie purchasing portals, such as Fandango (e.g., through a smart-phone application or webpage), publically available sales data, or through third party data collectors.

If there is presale data or in theater sales data available, the sales data may undergo an initial scoping and encoding process. For example, the sales data may be split into a first group for in theater sale data and a second group for presale data. Each of the first and second groups may be further analyzed to identify which users bought tickets and which users did not buy tickets in block 86. For example, a set of users may be assigned a "1" or other value when the user purchased a ticket and a "0" or other value when the user did not purchase a ticket.

Then, in block 88, a determination is made if the presale data or in theater sale data is sufficient to provide meaningful analysis based on a user-defined and/or statistical threshold. For example, the sales data may be analyzed to determine whether there are any meaningful correlations between user data and the sales data. In an aspect, if the amount of data is below a threshold amount of data or the variance of the sales data is above a threshold variance, then the sales data may be considered insufficient to provide meaningful analysis.

If the sales data is found to have an insufficient signal in block 88, or if there is no sales data available from block 84, then block 90 includes gathering sales data from similar digital content. Similar digital content may be identified, for example, by comparing one or more features, such as genres, budgets, actors, directors, screenwriters, and/or studio information of other digital content with the digital content 82, to find commonality. Further, the sales data for the similar digital content may be obtained through stored data or searching the Internet for related data, or be provided by a third party. Then, the sales data from the similar digital content may undergo scoping and encoding in block 92, which is the same process as in block 86, but applied to the similar digital content. As illustrated in the current embodiment, data for digital content 82 may be appended to data for the similar digital content of block 90 (block 91).

Next, in block 94, the data from block 86 and/or the data from block 92 along with user data sets are input into a machine learning system to predict a likelihood that the user would be interested in the digital content from block 82. The data is utilized to either train or tune the machine learning system. Data that is used to train the machine learning system includes both data that the machine learning system would receive in actual use (e.g., input data relating to users and the digital content) and data relating to the actual results of the input data. As such, the machine learning system can develop methods for predicting the result, and, through hindcasting, compare predicted results to actual results to determine which methods produce the correct result with the highest level of accuracy. In the present embodiment, the machine learning system may utilize a variant of classical field-aware factorization machine ("FFM") to process the data and predict purchase intent based on the provided data. FFM systems are utilized to predict results when presented with large, sparsely populated data sets and they are a new model class that combines the advantages of Support Vector Machines (SVMs) with the flexibility of matrix factorization models to deal with extreme sparsity of actual observations (hundreds of millions) out of very large number of possibilities (trillions of plausible digital interactions). After the machine learning system in block 94 has been sufficiently trained (e.g., when the machine learning system attains a certain level of accuracy) on example data sets (e.g., as established using precision, recall, and/or area under a receiver operating curve), the system may apply the predictions to the user data and digital content data to predict an interest level/propensity to purchase (e.g., the rate at which a user clicks on an advertisement and purchases the advertised product) for each user in block 96. In determining whether a user will click on the advertisement and purchase or view the digital content or not, the machine learning system may also provide a number indicative of the confidence that the predicted result will happen. The machine learning system may also order the predictions (e.g., in ascending or descending order) and/or return a set of users corresponding to a certain score range. Then, the list of users and the corresponding variables determined by the machine learning system (i.e., purchase intent and confidence value) are stored in block 98.

The hindcasting process, which ties together predicted affinities, customer-movie interactions, movie metadata and user demographics and social interests involves several stages of data preparation and manipulation to accurately assess model performance as if being used in production. In essence, to assess accuracy of the scoring, the interaction and purchase timeline is split into two windows: training and testing. The training data set spans from a certain defined time in the past $t_{-n}$ to $t_{-h}$, where n is the total number of time periods (ex: months, years, etc.) considered looking backward and h is the number of number of time periods in the past that are used for analysis (n>>h). The testing set is the remainder of the time periods leading up to present day (to), $t_{-h}$ to $t_0$. The positive interactions and the affinities are inferred from the training period. Using this data, sampled negative interactions (e.g., lack of interaction/purchase), user watch history, and demographic data, we assemble the FFM training data. The model is then trained and results are cross validated with the testing set. The accuracy measure of the area under the Receiver Operating Characteristic ("ROC") curve ("AUC") is tabulated on this held out data set for each iteration of learning process. Learning stops when the AUC drops d or more times (d is a hyper-parameter). This is an indication that the model has begun overfitting and that accuracy degradation has begun. Once the learning process has completed and the number of iterations has been recorded, the affinities are re-tabulated based on the $t_{-n}$ to $t_0$ timeframe. Then, as we train the FFM model, we use the number of iterations required in the training and validation stage to stop the learning process for the scoring of future movies. This will output weights to use for upcoming movie scoring for all customers in the system.

Next, the stored user list from block 98 is analyzed to determine whether the user list is sufficiently sized to provide a target number of advertisements (block 100). For example, an advertiser may provide a minimum and/or maximum size as an input, indicating a minimum and/or maximum target audience size. If the list is within threshold values, then no further analysis is performed, and the list of users is output in block 106.

If the list is below a threshold value, further analysis may be performed to find more users to display advertisements. To find a larger list of users, an affinity prediction analysis is performed on the user data and the digital content data in block 102. As discussed in further detail below, an affinity prediction analysis compares term usage of a user and the same or similar term usage by a set of users. For example, if the user uses a certain term at a higher rate than the set of users, then the user is assumed to have an affinity for the term and products related to the term. Further, if the term is also related to the digital content from block 82, then the user may be added to the user list generated in block 98. After finding at least one user using the affinity prediction analysis, the system compares demographics of the at least one user to demographics of other users in the set of users in block 104 and/or infers dominant demographics from FFM scoring. Users from the set of users that sufficiently match the demographics of the user found using the affinity prediction analysis may also be added to the user list generated in block 98.

After finding similar users in block 104, the analysis of the user data and the digital content data is complete and the list of users is output in block 106. The list of users may be determined based on the scores from blocks 94 and 102. For example, users that have a high score are more likely to be interested in the piece of digital content, and users that have a low score are less likely to be interested in the piece of digital content. An advertiser may provide interest range thresholds, specifying upper and/or lower interest bounds that the target audience should have. Accordingly, the list may exclude users that score above a first threshold value because those users are very likely to already purchase the digital content without an advertisement. Further, the list excludes users that score below a second threshold value because those users are very unlikely to purchase the digital content even if those users view an advertisement.

Then, at block 108, targeted content for the digital content selected in block 82 may be transmitted to and displayed on personal devices associated with users on the list output in block 106. For example, an ad publisher may provide an ad via webpages such as social media, digital content related websites (e.g., Rotten Tomatoes, Fandango, etc.), or through digital content related smart-phone applications (e.g., Rotten Tomatoes, Fandango, etc.).

Figure 2B:
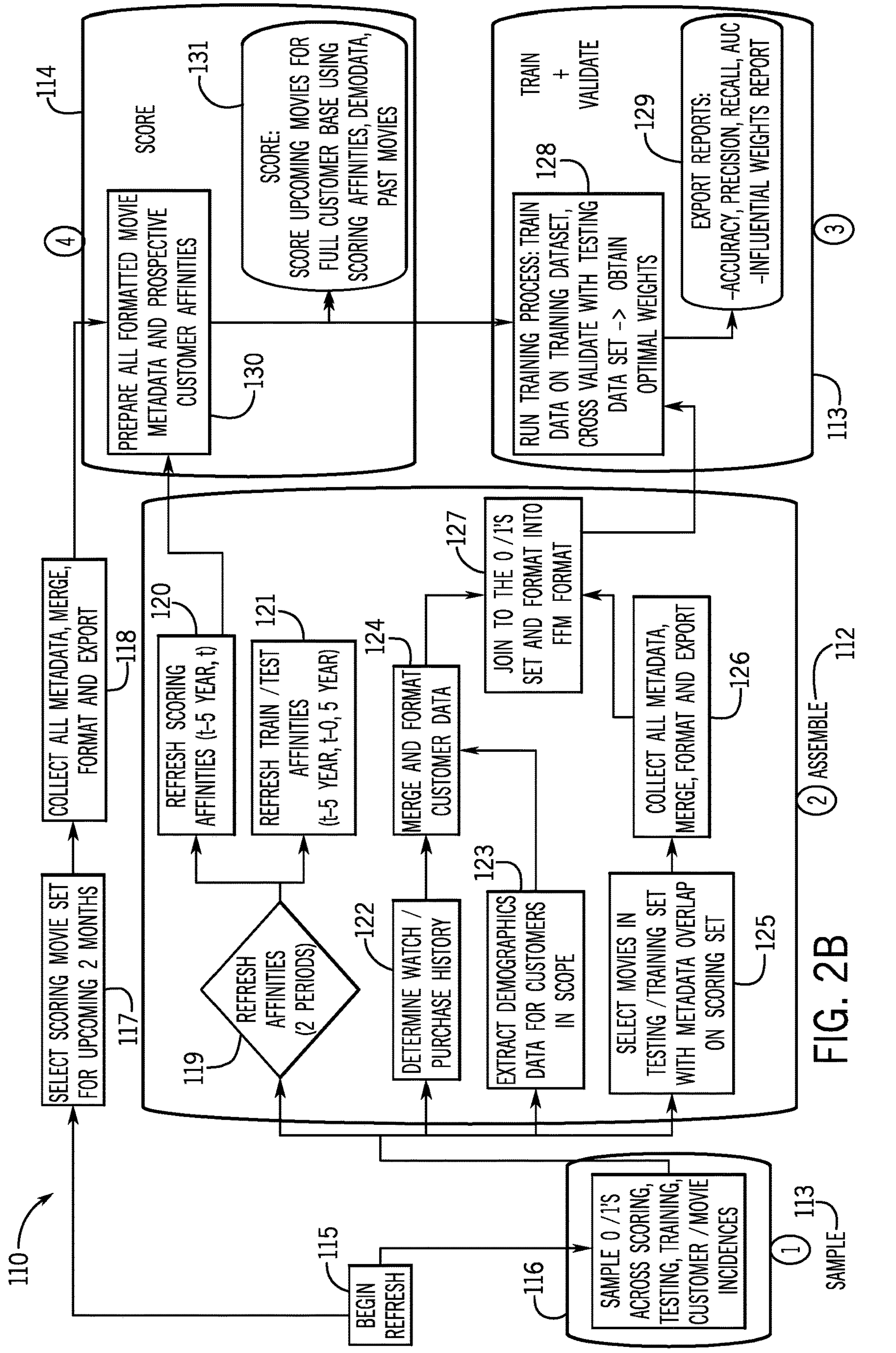
FIG. 2B is a process flow diagram illustrating an alternative manner in which the targeted content delivery system of FIG. 1 determines whether targeted content is provided to a user and which targeted content should be provided to the user, in accordance with an embodiment of the present disclosure.

FIG. 2B is a process flow diagram illustrating a detailed process flow 110 of the machine learning system 43 of FIG. 1. The process flow 110 relates to determining whether targeted content is provided to a user and which targeted content should be provided to the user, in accordance with an embodiment of the present disclosure. The process 110 includes four main phases, a sampling phase 111, an assembly phase 112, a training and validation phase 114, and a scoring phase 114.

The process 110 can be thought of as a data processing pipeline that refreshes at a certain cadence (e.g., daily, weekly, bi-weekly, etc.). Accordingly, the process 110 begins with a refresh (block 115) at the cadence interval. Upon beginning the refresh, the sampling phase 111 begins. In the sampling phase 111, a sample of occurrences of customer incidences (e.g., movie purchases) is gathered. This may be referenced as 1s data, meaning that a positive occurrence has occurred. Further, a sample of non-occurrences of customer incidences (e.g., non-purchases of movies) is gathered. This may be referenced as 0s data, meaning that a negative occurrence has occurred. In some embodiments, 0s data may be imputed from available 1s data. Details regarding the creation of feature sets and 0s and 1s data is discussed in more detail below, with regard to FIG. 3. The sampling of 0/1s data is illustrated as block 116 in FIG. 2B.

Additionally, upon commencement of the refresh at block 115, a set of historical content (e.g., a movie set) that may have overlapping metadata and may be useful for scoring in the near future (e.g., two months) are selected (block 117). The metadata for the selected set is collected, merged, and formatted for export to the scoring process 114.

Once the 0/1s sampling is gathered, the assembly phase 112 may be used to append additional data to the sampled 0/1s. As depicted in block 119, affinities for two periods of time are refreshed. For example, in block 120 scoring affinities, used in the scoring phase 114, for a time period from a current time (t) to historical time (e.g., 5 years back (t−5)) are refreshed. Further, training and testing affinities are also refreshed (block 121). Training affinities, used to train a prediction model, are refreshed from t to the historical time (e.g., t−5 years). Testing affinities, used to test the prediction model, are refreshed from t to a proximate historical time (e.g., six months (t−6 months).

At block 122, the sampled users' watch/purchase history is determined. For example, a watch and/or purchase history for movies may be identified by an online (e.g., a web application) and/or offline (e.g., Box Office) data source. This watch and/or purchase history for the sampled users may be compiled for subsequent use.

Demographic data of the customers associated with the 0/1s samples may also be extracted (block 123). For example, a 0 may be generated for a female and a 1 for a male. Further, age, race, and/or other demographic information may be extracted for assembly with the sampled.

The watch/purchase history of block 122, the demographic data extracted in block 123, and the refreshed training/testing affinities of block 121 may be merged and formatted into customer data (block 124). For example, the merged and formatted customer data may provide an indication of customer-specific demographics, movie-related features, as well as affinities.

The process 110 also includes selection of content (e.g., movies) in the testing/training set with metadata overlap on the scoring set (block 125). For example, if the targeted content relates to an upcoming movie in the legal thriller genre, other previous movies with the same legal thriller genre may be selected. Movies could be selected based upon any type of metadata overlap.

The available metadata for the selected content of block 125 is collected, merged and formatted for use in the assembly phase 112. The merged and formatted customer data of block 124 and the collected, merged, and formatted metadata of block 126 is joined 0/1s sample and formatted into a factorization machine (FFM) format (block 127). A detailed description of the FFM format is provided below with regard to FIG. 4.

Once the data is joined in block 127, the training and validation phase 113 commences. In the training and validation phase 113, the training process is run, cross validating with the testing data set (block 128). In the training process, the prediction model is trained on the training dataset. Further, during validation, testing dataset is used to obtain optimal weights for each feature of the data. These processes are discussed in more detail below with regard to FIG. 3.

Based upon the results of block 128, reports may be exported (block 129). For example, the reports may provide an indication of accuracy, precision, Area under the Curve (AUC), and/or influential weights. These factors are discussed in more detail below, with regard to FIG. 3.

After training and validation, the scoring phase 114 may commence. In the scoring phase 114, all formatted metadata from block 118 and prospective customer affinities of block 120 are prepared and formatted for use by the prediction model (block 130). The data from block 130 is then used to determine scoring (block 131), as discussed in more detail below.

Figure 3:
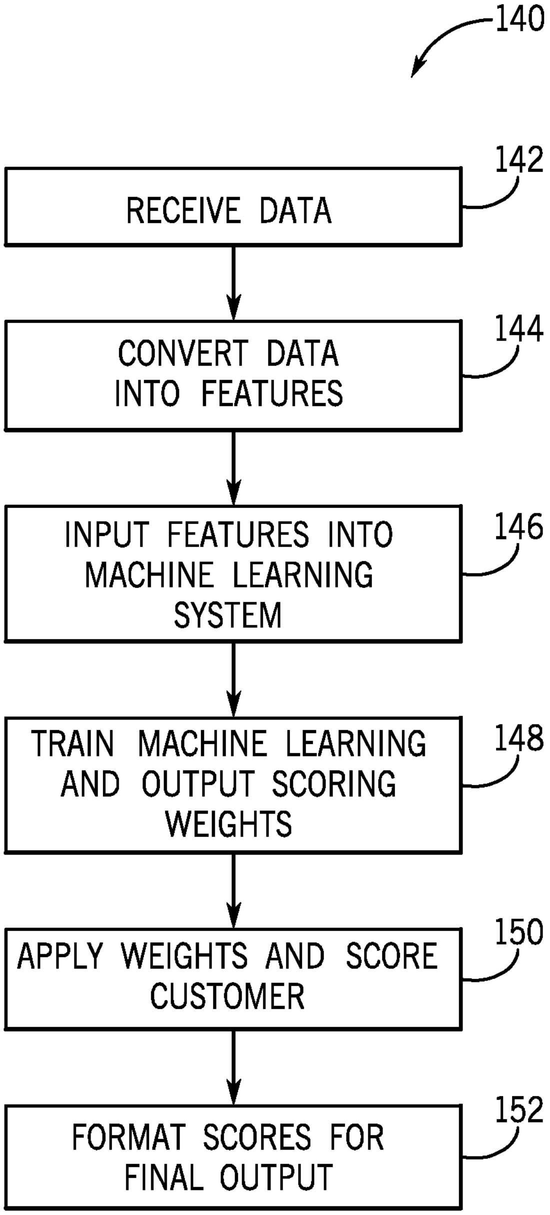
FIG. 3 is a process flow diagram illustrating a manner in which a machine learning system determines predictions for a likelihood that a user would be interested in a particular piece of the digital content, in accordance with an embodiment of the present disclosure.

As mentioned above, machine learning may be used to determine a user propensity for a particular piece of digital content. FIG. 3 is a process flow diagram illustrating a manner in which a machine learning system determines predictions for a likelihood that a user would be interested in a particular piece of the digital content. In particular, the process 140 begins by receiving data in block 142 at a cloud based services system, a machine learning system, or another system. The received data may include data relating to users (e.g., demographic traits, theatrical preferences, experiential preferences, transactional behavior, social behavior, psychographic behavior, etc.), to digital content (e.g., actors, genres, directors, studios, ratings, ticket sales, popular formats, etc.), to user interaction (e.g., browsing behavior, viewing behavior, clicking behavior, dwell time, click through rate, conversion probability, mean time between transactions, transaction volume, etc.), or to considerations (e.g., user decisions that were not made, such as a user choosing movie x over movie y). This data may be sourced from a multitude of sources, including computer transactional logs, movie metadata repositories, theater data repositories, web site usage tracking, and/or third parties that store users' data and interactions across the Internet. Next, the data is converted into features utilizing feature extraction and/or generation in block 144. In the present embodiment, features may be data that have been converted into a table of zeroes and ones that enable other systems, such as a machine learning system, to interface with the data more easily. By utilizing feature extraction and/or generation, the raw data from block 142 is converted into zeroes and ones. For example, a male user may be denoted by a 1 in a gender category, and a female user may be denoted by a 0. Accordingly, after the data is converted into features, a feature data set may include bit-level classifications of the data received in block 142, enabling correlations to be drawn from the data.

Model facts are generated from multiple data sources, including electronic transactions (e.g., Fandango transactions), ratings and reviews associated with the digital content (e.g., Rotten Tomatoes ratings and reviews), subscription services (e.g., Fan Alerts and Favorite Movies), etc. Movie specific behaviors are defined by 1s in the model. The movie conversion rate (e.g., the ratio between the number of transacted users and an awareness user group) is estimated using features, such as a movie budget, domestic gross revenue, and/or Rotten Tomatoes critics' reviews and scores. Using the previously defined 1s and the conversion rate estimation, a stratified sampling based on groupings of users' overall transaction frequency and/or recency is utilized to generate 0s. The 1s and 0s are combined as training and testing model facts.

Movie data is generated from one or more data sources as well. Movie data may include attributes of movies, such as cast, producer, genre, etc. and/or may also include attributes of movies dependent upon user behaviors, such as opening week Box-Office numbers, etc. Accordingly, a number of movie data sources may be used, including electronic transactions and web browsing data, digital content metadata, and third party sources including demographics, social interests and other publicly available content metadata sources. This third party data is added to enrich the connectivity between movies, as additional features enable movies to link to other movies via additional dimensions.

Dynamic feature generation is used to ensure important features (e.g., actors, directors, franchise info, BoxOfficeMojo tags, etc.) from the scoring movies sets are encoded as an individual field, instead of simply a feature within a field. This ensures that features used in scoring movies are captured through learning process.

User/customer data is also generated via multiple data sources. In addition to user affinities and past purchase behavior, demographic information is also integrated as user features. Similar to movie data, user affinities for features in scoring movie are encoded as an individual field.

After converting the data into features in block 144, the features are input into the machine learning system in block 146. The machine learning system may utilize FFM to receive the features and predict an interaction (e.g., purchase intent) based on the features. As discussed above, FFM is a machine learning system that is utilized to identify correlations between the interaction (e.g., purchase behaviors) and different feature combinations, and FFM systems are specialized for data sets that are sparsely populated (e.g., data sets having many more zeroes than ones).

After receiving the features in block 146, the machine learning system is then trained and scoring weights are outputted in block 148 based on the features. In determining the user score, the machine learning system may utilize the following sample equation:

$$\phi_{FFM}(w, x) = \sum j_{1\in A} \sum j_{2\in A} (w_{j_1,f_2} * w_{j_2,f_1}) x_{j_1} x_{j_2} \quad \text{Equation 1}$$

In reference to the above equation, each summation determines whether an interaction between different features is present. For example, $x_{j_m}$ relates to the occurrence of a particular feature $j_m$, and $x_{j_m}$ is either equal to 1 if the feature is present or zero if the feature is absent. In some instances where continuum values are present, such as the case of ratings and/or affinities, actual values normalized between 0 and 1 may be used. Further, $w_{j_m f_n}$ represents feature m interacting with field n, where a second feature belongs to field n. In other words, $w_{j_m f_n}$ is the coefficients vector of an interaction between two different features. For example, the first feature $j_1$ in a first field may correspond to a male demographic feature in the gender field and the second feature $j_2$ may correspond to action movie genre feature in a genre field. Thus, $w_{j_m f_n}$ would describe the coefficients vector of males for action movies.

Features may relate to users (or consumers) such as demographic traits (e.g., gender, race, age, etc.), theatrical and experiential preferences (e.g., genre affinity, director affinity, actor affinity, rating affinity, format affinity, etc.), transactional preferences (e.g., theater and chain preference, show day preference, show time preference, purchase day preference, etc.), and social and psychographic behavior (e.g., followers and friends on social media, influencer status, aggregate activity on social media, digital content related activity, device preferences, brand affinity, publisher interactions, other interests, etc.). Additionally, features may relate to digital content such as metadata (e.g., actors, genres, directors, etc.), review based traits (e.g., Rotten Tomatoes score, awards nominated for or won, etc.), and transactional measures (e.g., ticket sales, popular formats, etc.). I represents features relating to user interactions such as browsing behavior, viewing behavior, and clicking behavior on websites or applications. The data relating to user interactions may also include transactional behavior such as time since a user's last transaction, mean time between transactions, and overall transactional volume.

In some embodiments, Equation 1 may be used for all of the possible feature combinations. However, using Equation 1 with all possible feature combinations may lead to overfitting (e.g., the system is good at predicting very specific data sets, but bad at predicting different data sets) and increased processing time. Accordingly, a portion of the possible combinations may be chosen. A reduced set of combinations may be chosen based on the breadth of available data for the combinations or on the likelihood that the combinations affect the prediction. Thus, $\phi_{FFM}$(w,x) is a set of weights that describes the effect for each of the combinations that is utilized.

The values from Equation 1 are input a regularized log loss function that is minimized via stochastic gradient search using distributed technologies over the training data set. For example, the following equation may be utilized:

$$w *= \operatorname{argmin}(\frac{\lambda}{2}\|w\|_2^2 + \sum_{i=1}^{m}\log(1+\exp(-y_i\phi_{FFM}(w, x_i))) \quad \text{Equation 2}$$

In reference to the above equation, the logistic function represents training/testing error. The training/testing error decreases when model accuracy increases. In addition, λ penalizes the magnitude of the weight/parameter vectors, helping to minimize overfitting. The result of the Equation 2 is a set of vector weights that may be applied to testing data sets to find predictions in block 150. For example, after the stochastic gradient descent has occurred, the optimized weight set (w*), from Equation 2 may be input into Equation 1 in place of w, such that Equation 1 becomes a function of $\phi_{FFM}(w^*,x)$.

Next, the user score from Equation 1 may be converted to a value from [0,1] in block 152 using the following equation:

$$p_i^j(x) = \frac{\exp(\phi_{FFM}(w*, x))}{1+\exp(\phi_{FFM}(w*, x))} \in [0, 1] \quad \text{Equation 3}$$

In reference to Equation 3, j represents a particular piece of digital content and i represents a particular user. Further, Equation 3 provides a user score between 0 and 100. While the above equations may provide an accurate prediction for a user's affinity toward a certain piece of digital content, the data input into the machine learning system may be very large, which would lead to large models, increased processing time, greater storage, and overfitting (i.e., when the test models fit test data well but do not adapt to new data well). To avoid processing too much data, certain techniques may be utilized to reduce the amount of data utilized for the analysis. For example the data may be reduced by down-sampling the "non-transacting set" and/or utilizing cross validation mechanisms, such as k-fold cross validation, on the training set of data.

During training process, different case weights may be assigned to 1s and 0s, such that 1s receive a higher weight. One reason for this is 1s are actually observed behavior and are, therefore, may be considered more valuable than 0s. Also, this can adjust the precision/recall balance of the model. More emphasis may be placed on recall compared to precision, due to the assumption that the observed 1s are limited by our visibility.

Optionally, after determining a user score in block 148, accuracy of the user score may be validated. For example, a set of testing data may include all historical data transactions. Thus, the machine learning system can find patterns from the training data that convert to strong predictions on the testing data set.

Instead of a random split between training and testing, feature data provided to the model is split using different movie sets to simulate real world application. This split mechanism ensures the model is learning from existing records and can be used to predict unseen movies. This ensures the strictest standard is applied when evaluating model performance.

In order to combat overfitting, the following early termination logic is applied. Training data are randomly split into n chunks, and fed into the model sequentially. After each iteration, the updated coefficients will be applied to the testing data, and validation metrics such as accuracy, recall, precision, Area under the Curve (AUC) are calculated to evaluate latest model parameters. AUC may be used as the primary criteria for evaluation. The training process may be automatically terminated when the testing performance starts to converge or decline; the weights with best testing AUC are kept and utilized.

Optimal values for hyper-parameters like learning rate, class-weight, and regularization factors may be obtained from multiple testing runs, and utilized as standard modeling configuration.

Another method of reducing the data may be to select only certain features to be utilized in the machine learning system. For example, when choosing features, a certain number of the features that appear at the highest rates in the data sets may be utilized. Reducing the amount of data analyzed by the machine learning system can reduce model size, processing time, storage requirements, and prevent overfitting.

During scoring process, dynamic weights are assigned to scoring movie specific attributes, depending on the attributes' frequency in the overall data set. Higher weight will be assigned to attributes with a low frequency, so that the movie specific features like actor, director, and franchise have higher influence during the scoring process, as compared to more general features such as genre, Rotten Tomatoes score, and keywords. By applying this dynamic weights logic, the signal from movie specific features is strengthened, so that general features do not dominate the scores.

Additionally, following training and testing processes, an analysis may be performed to identify which features contribute the most to false negative predictions as well as to false positive predictions. An iterative approach may be used where features that are "repeat offenders" (appear often in these lists) are excluded from future iterations of the algorithm.

Figure 4:
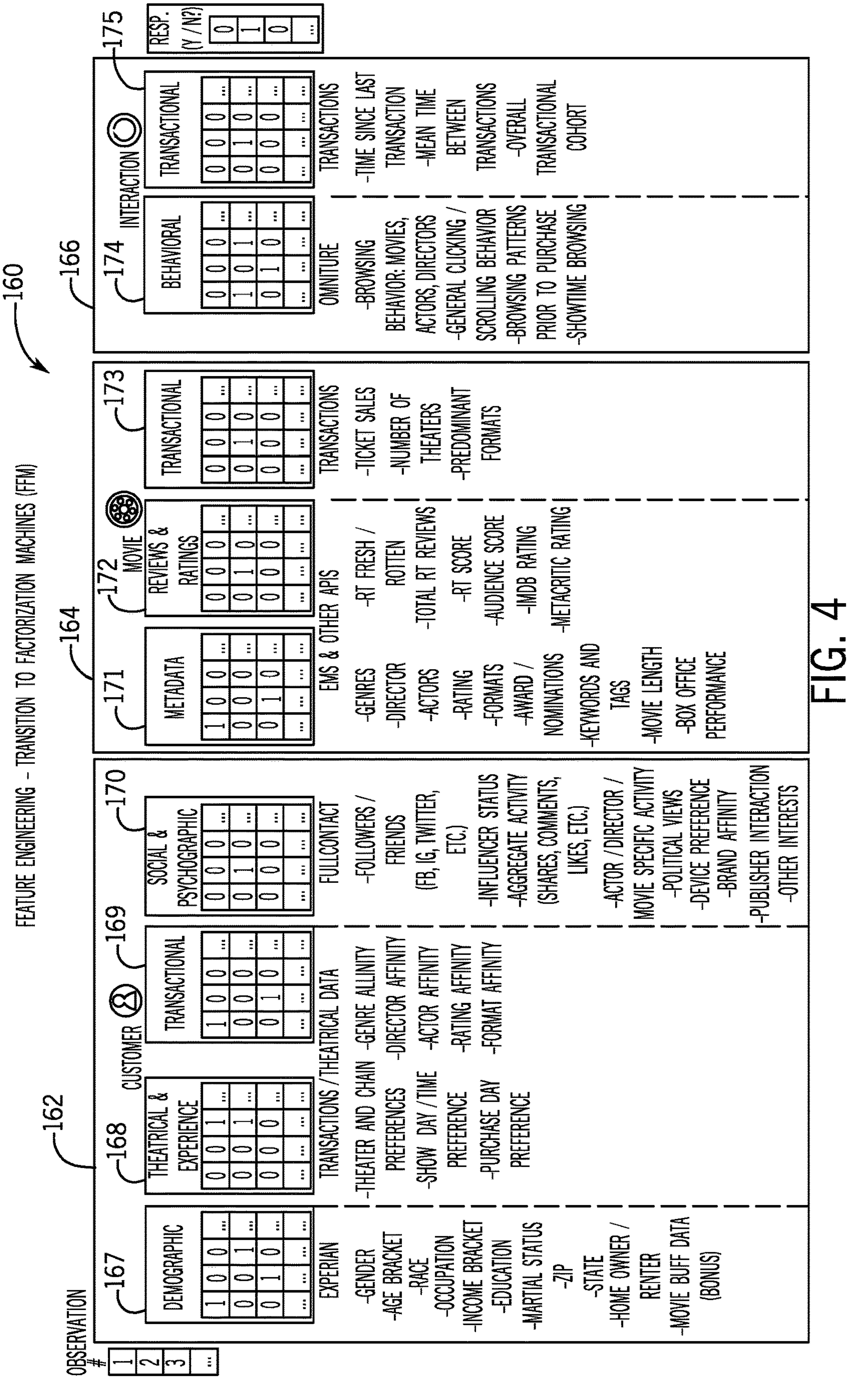
FIG. 4 depicts an FFM format, in accordance with an embodiment of the present disclosure.

As described above, the raw user and movie data utilized by the machine learning system may be converted into a set of features, stitched together by occurrence pairs and non-occurrence pairs and are ingested into the algorithm of the machine learning system. FIG. 4 illustrates a feature table 160 of features that the machine learning system may interact with. As discussed above, the features may be expressed as a customer field 162, a digital content field 164, and an interaction field 166. In the present embodiment, the customer field 162 includes features relating to demographic features 167, theatrical and experience features 168, transactional features 169, and social and psychographic features 170. The movie field 164 includes features relating to metadata features 171, review and ratings features 172, and transactional features 173. The interaction field 166 includes features relating to behavioral features 174 and transactional features 175.

Each row 176 for each of the features 167, 168, 169, 170, 171, 172, 173, 174, and 175 relates to a specific feature (e.g., gender, genre affinity, ticket sales, etc.) includes a "1" if a data relating to the feature is present and a "0" if there is not data relating to the feature, or a value from 0-1 in the case of a continuum, such as ratings and/or affinity values. For example, in a row 176 related to age bracket in demographic feature 167, a "1" indicates that the user is in the specified age bracket, while a "0" indicates that the user is not in the specified age bracket. All of the features in the feature table 160 are expressed in this manner to enable the machine learning system to interact with the data.

Figure 5:
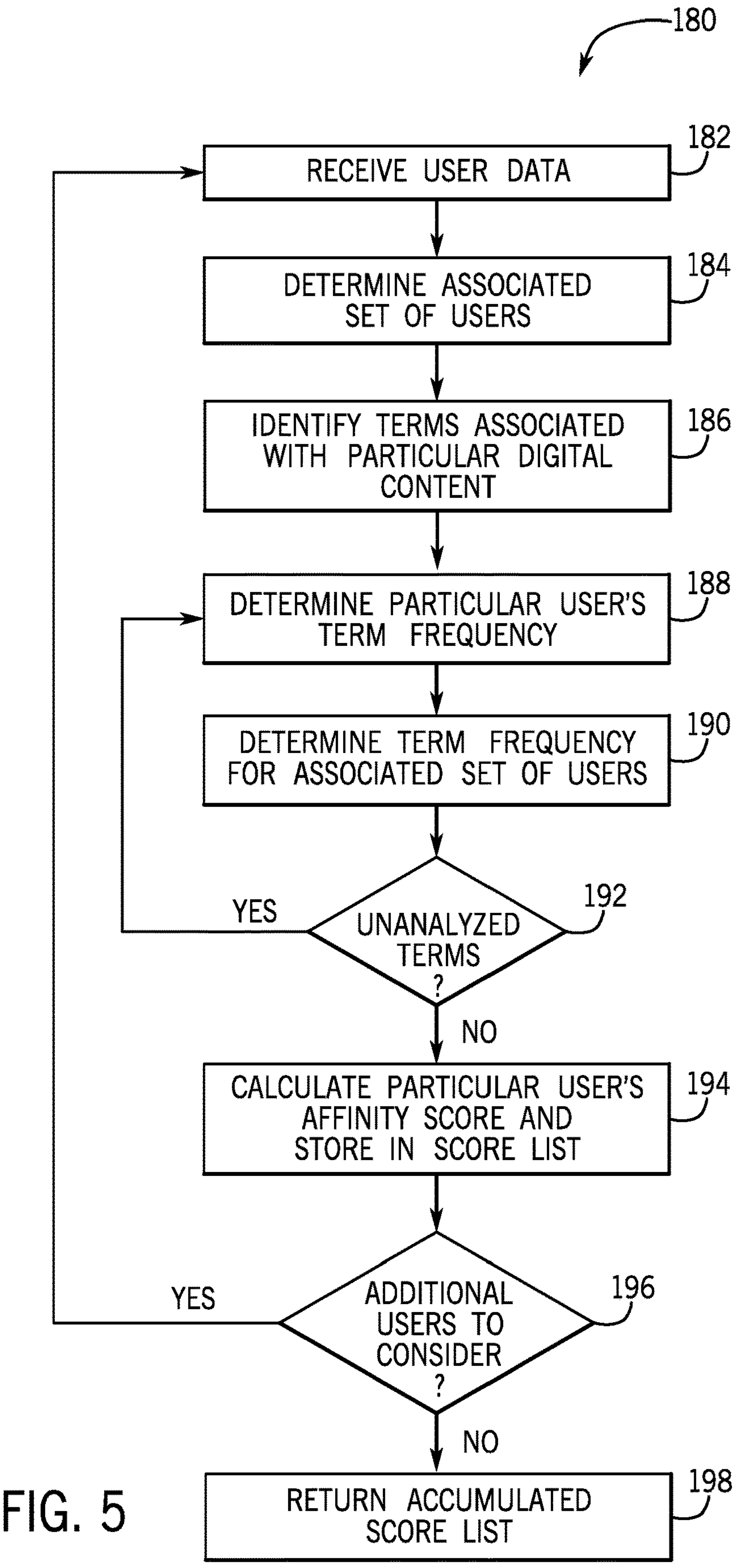
FIG. 5 depicts a process associated with an affinity prediction analysis of user data to predict a user's interest in a particular piece of digital content, in accordance with an embodiment of the present disclosure.

As mentioned above, affinity prediction analysis may be performed by the cloud services system of FIG. 1 to determine a user affinity for a particular piece of digital content. FIG. 5 depicts a process 180 associated with an affinity prediction analysis of the user data to predict a user's interest in a particular piece of digital content. The process 180 may be used in conjunction with the process of FIG. 3, or either process may be used independently. In particular, the process 180 begins by receiving user data in block 182 at a cloud based services system or a prediction system. The received user data includes data relating to users metadata (e.g., browsing history, purchase history, term usage history, social media posts and actions, location information, etc.).

This data may be sourced from tracking user behavior through web sites, or the data may be sourced through third parties that store users' data and interactions across the Internet.

Then an associated subset of users of a group of users is determined in block 184 using the data in block 182. The associated subset of users are groups of users that share one or more common attributes found in the metadata that makes them more fair to compare to one another. For example, the associated set of users may be determined based on the number of movie tickets purchased by each user in a given timeframe. Thus, a first set of associated users could be one that has purchased a small amount of movie tickets (e.g., one to three movie tickets), a second set of associated users could be one that has purchased an intermediate amount of movie tickets (e.g., four to seven movie tickets), and a third set of associated users could be one that has purchased a large amount of movie tickets (e.g., eight or more movie tickets). Thus, when analyzing a specific user, the specific user is compared to other users in the same set of users.

Terms associated with particular digital content is identified in block 186. The purpose of the affinity prediction analysis is to determine whether a particular user would be interested in a particular piece of digital content. Accordingly, analyzing terms associated with the digital content (e.g., the director of the digital content, the genre of the digital content, the billed actors in the digital content, the studio that produced the digital content, etc.) provides meaningful results.

Next, a particular user from the data in block 182 is selected for analysis to determine the particular user's term frequency in block 188. The block 188 relates to a first aspect of the affinity prediction analysis. For example, the terms found in the user's movie history metadata may be split into different categories of related terms. The categories may include as genres, actors, directors, studios, composers, etc., and each category may include related terms. For example, the category genre may include related terms such as action, horror, comedy, romance, etc. Then, for each user, the term frequency for a term may be determined by dividing the number of times a specific term occurs in the metadata of the user by the number of terms within the category are associated with the user within the metadata. Equations 4-7 below provide equations for calculating term frequency for a genre category (Equation 4), an actor category (Equation 5), a director category (Equation 6), and a studio (Equation 7).

$$f_{g,u} = \frac{tf(g, u)}{|G_u|} \quad \text{Equation 4}$$

$$f_{a,u} = \frac{tf(a, u)}{|A_u|} \quad \text{Equation 5}$$

$$f_{d,u} = \frac{tf(d, u)}{|D_u|} \quad \text{Equation 6}$$

$$f_{s,u} = \frac{tf(s, u)}{|S_u|} \quad \text{Equation 7}$$

As discussed above, in each of these equations, the numerator is the total number of times a specific term occurs within the metadata of the user. For example, if the term director John Smith is found ten times in the metadata corresponding to the user (e.g., the user watched ten movies from director John Smith), the numerator would be 10.

Further, in each of these equations the denominator is the number of movies that the user has watched with this category of terms present. Accordingly, in this example, if the total number of movies that have a director named in the metadata corresponding to the user is twenty (e.g., the user watched twenty movies with named directors), then the denominator is 20. In this example, the term frequency would be 0.5. In this example, J.J. Abrams accounts for half of all director terms found in the metadata. In an aspect, the term frequency for each term may be a number between zero and one. For example, if John Smith is not found in the metadata, then the term frequency would be zero. Conversely, if all of the director terms found in the metadata were John Smith, then the term frequency would be one. The term frequency for each of the terms identified in block 186 may be determined.

As may be appreciated, any number of categories may be considered in similar equations. For example, for actors, a numerator of the equation may be a total number of movies with an actor "Jane Smith". The denominator may be the total number of movies in the user's metadata with an actor listed.

Further, different weights may be applied to different types of metadata. Different types of interactions may illustrate different levels of interest a user has in a term. For example, data indicative of a user watching a video with J.J. Abrams in the title of the video may be weighted more heavily than data indicative of a user searching a term related to J.J. Abrams (e.g., a piece of digital content that J.J. Abrams is listed in the credits for). Further, data may be weighted differently based on the age of the data. As time passes, a user's interests may change. As such, data that is older may be less relevant to a user's current interests. For example, older data may receive a penalty weight while newer data may receive a bonus weight.

Referring to block 190, after determining the term frequency value of the term, an inverse term frequency may be determined as a second aspect of the term frequency analysis. To determine the inverse term frequency, the following equation may be utilized:

$$\text{if } (t, U) = \log\left(\frac{N}{|\{u \in U; t \in u\}|}\right) \quad \text{Equation 8}$$

In reference to Equation 8, N represents the total number of users within the associated set of users U. Further, $|\{u \in U; t \in u\}|$ represents the number of users within the associated set of users U for which the term t appears. The log is taken to normalize the value. In some cases, the term t may not appear for the associated set of users U, which may lead to a divide by zero error. Accordingly, a small constant may be added to avoid a divide by zero error. Further, Equation 8 may be applied to all of the terms identified in block 186.

After determining the user's term frequency in block 188 and the cohort's inverse frequency in block 190, the decision block 192 may be utilized to ensure that every term identified in block 186 is analyzed. If there are still unanalyzed terms remaining, then blocks 188 and 190 are repeated. However, if all of the terms identified in block 186 have been analyzed, the process continues to block 194.

After determining the user's term frequency in block 188 and the cohort's inverse frequency in block 190, a score representative of the particular user's usage of a term compared to other users in the associated set of user usage of the term may be determined (block 194). To do this, the product of a particular user's term frequency and the cohort's inverse frequency is determined according to Equation 9.

$$tfidf(t, u, U) = f_{t,u} \times idf(t, U) \quad \text{Equation 9}$$

Determining the product of blocks 188 and 190 provides a number between zero and one, which provides a scale that is easier to analyze and manipulate. Further, block 194 may be repeated for all of the terms identified in block 186, and the summation of the scores determined in block 194 represents a final user score relating to the particular piece of digital content as shown in Equation 10.

$$S(u, m) = \sum_{t \in \{G_m, A_m, D_m, S_m\}} w_t \times tfidf(t, u, U) \quad \text{Equation 10}$$

Genres, may include terms such as Action, Thriller Horror, etc. Actors could include particular actor names, such as "John Jones". Directors could include particular director names, such as "John Smith". Studio could include particular studio names, such as "Universal". While Genre, Actor, Director, and Studio are provided as term categories, this is not intended to limit the list of categories. Indeed, many other term categories can be associated with a piece of content.

Given a piece of content, m, containing several terms in the Genre (G), Actor (A), Director (D), and Studio (S) realms, namely $G_m$, $A_m$, $D_m$, $S_m$, respectively, we can derive the following score for a given user, u. For example, a higher score determined in block 194 represents a high affinity for the particular piece of digital content. Further, the user scores associated with each user are stored in a score list of users. Further, manual weights ($w_t$) may be applied, as indicated by Equation 10, updating the affinities based upon weights supplied by a user and/or administrator of the system.

Then a decision block 196 is utilized to ensure that a desired number of users are analyzed. For example, if the score list does not contain a minimum number of desired users and associated scores, blocks 182 through 194 may be repeated. Alternatively, if too many users are returned, tightened thresholds may be used to decrease the number of users. After a desired number of users have been analyzed, the process 180 continues to block 198.

In block 198, the process 180 returns an accumulated score list that includes a list of users and scores associated with each of the users. The accumulated score list may be organized by the user scores. Further, the accumulated score list may be utilized to identify which users receive a targeted advertisement.

Figure 6:
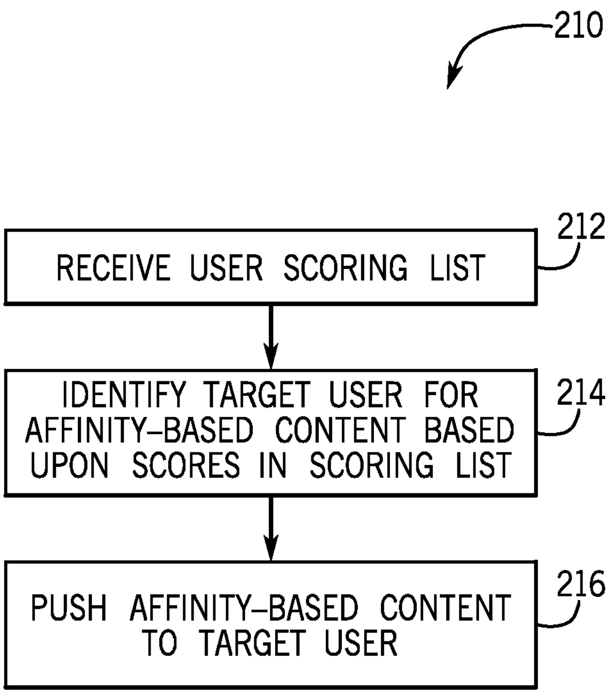
FIG. 6 depicts a process for pushing affinity-based content to a target user, in accordance with an embodiment of the present disclosure.

FIG. 6 illustrates a process 210 for determining which users receive targeted content (e.g., targeted advertisements) associated with primary content (e.g., a movie) based on the user scoring list. In particular, the user scoring list is received in block 212. The user scoring list may contain users and associated scores determined by the process illustrated in FIG. 3, the process illustrated in FIG. 5, or both. For example, a user scoring list with scores from both processes will include a user reference, a first score from one of the processes, and a second score from the other process. In embodiments in which only one of the processes is utilized, the user scoring list will include only one score for each user.

After receiving the user scoring list in block 212, target users are identified in block 214 for targeted content transmission based on scores in the user scoring list. The scores in the scoring list indicate a user's interest in a particular piece of digital content. For example, a higher number indicates a greater interest than a lower number. As such, in some examples, users with a score above an upper threshold value are already very interested in the particular piece of digital content. Thus an advertisement will not change the user's decision, because the user has presumably already decided to consume the particular piece of digital content. Conversely, users with a score below a lower threshold value are very disinterested in the particular piece of digital content. Thus, an advertisement is very unlikely to convince the user to consume the particular piece of digital content. Users whose scores are in between the upper threshold value and the lower threshold value are seen as users who have some interest in the particular piece of digital content, but may not consume the particular piece of digital content without additional convincing. Accordingly, in some embodiments, target users identified in block 214 are users whose scores are below the upper threshold value and above the lower threshold value.

After identifying the target users in block 214, targeted content is pushed to the target users in block 216. For example, the targeted content pushed to the target users may be put in a queue, such that the next time the target user opens a particular web page or particular application, the targeted content may be displayed to the target user.

Figure 7:
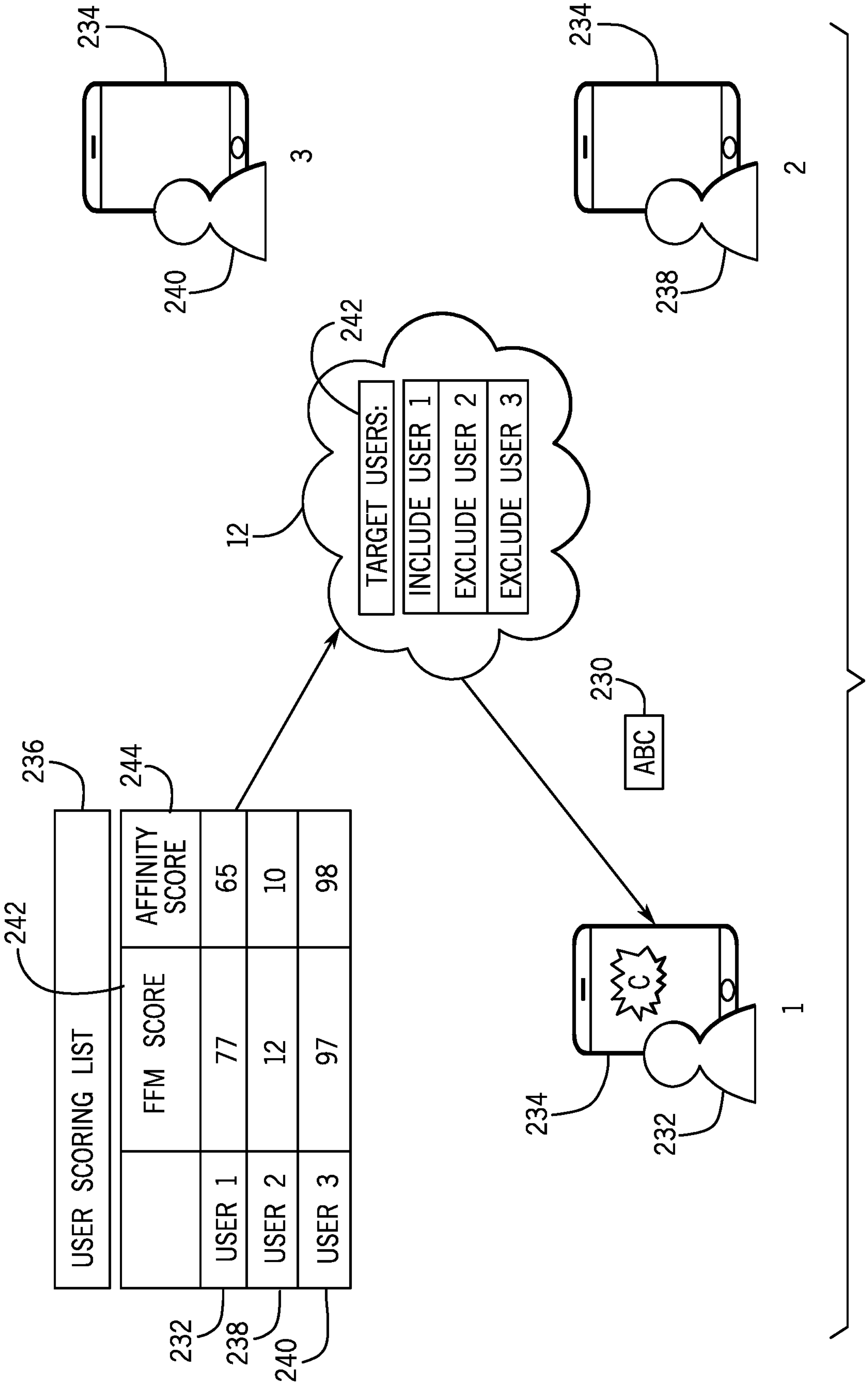
FIG. 7 is a schematic diagram illustrating a representative advertisement on a user's personal device after determining a user score, in accordance with an embodiment of the present disclosure.

FIG. 7 illustrates the cloud services system 12 pushing a representative advertisement 230 to a first user's 232 personal device 234. As described above, the cloud services system may receive a user scoring list 236 that includes the first user 232, a second user 238, and a third user 240, and associated scores, such as FFM scores 242, affinity scores 244, or a combination thereof. In the present embodiment, the first user 232 has intermediate scores for the FFM score 242 and the affinity score 244, the second user 238 has low scores for the FFM score 242 and the affinity score 244, and the third user 240 has high scores for the FFM score 242 and the affinity score 244.

As described above, in some embodiments, users with scores (e.g., FFM score 242, affinity score 244, or both) above an upper threshold value (e.g., 80) and users below a lower threshold value (e.g., 30) do not receive advertisements, while users with scores (e.g., FFM score 242, affinity score 244, or both) between the upper threshold value and the lower threshold value do receive an advertisement. For example, the upper threshold value may be a value that indicates users that are very interested in the content and may not require targeted content for persuasion. The lower threshold value may indicate users that are not interested in the content and that would not likely be persuaded even if targeted content is provided. In the present embodiment, the scores (e.g., FFM score 242, affinity score 244, or both) for the first user 232 are between the upper threshold and the lower threshold, the scores (e.g., FFM score 242, affinity score 244, or both) for the second user 238 are below the lower threshold, and the scores for the third user 240 are above the upper threshold. Accordingly, a target user list 242 determined by the cloud services system 12 illustrates the first user 232 as included in the list of users to receive an advertisement, and the second user 238 and the third user 240 as excluded from the list of users to receive an advertisement. Thus, the cloud services system 12 pushes the advertisement 230 to the personal device 234 of the first user 232, and the advertisement is displayed on the personal device 234 of the first user 232. Because the second user 238 and the third user 240 are excluded from the target user list 242, the advertisement 230 is not pushed to or displayed on the personal devices 234 of the second user 238 and the third user 240.

By using the current techniques, electronic advertisement provisions may be greatly improved. For example, more applicable advertisements may be provided to users with an affinity for a particular product. Further, certain users that clearly lack an affinity for the product may be excluded. In preliminary testing comparing the above-described embodiments to traditional targeted content campaigns, the above-described embodiments averaged lower cost per acquisition higher conversion rates. Further, the preliminary testing found a strong correlation between the user scores and the cost per acquisition. In other words, the cost per acquisition was higher for users with a lower score, and the cost per acquisition was lower for users with a higher score.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "block for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A cloud services system, comprising one or more processors and a memory accessible by the one or more processors, the memory storing instructions comprising:

prediction logic that, when executed by the one or more processors is configured to cause the one or more processors to:

receive a set of user metadata for a group of users, the user metadata comprising data relating to user browsing history, purchase history, term usage history, social media posts and actions, location information, or a combination thereof;

identify a subset of users of the group of users, wherein the subset of users share a common attribute found in the set of user metadata;

select at least one user from the subset of users;

select a term from a category of terms related to a piece of digital content;

determine a first value by comparing a first total of appearances of the term and a second total of appearances of all terms from the category of terms within the set of user metadata corresponding to the at least one user;

determine a second value for the subset of users by determining a portion of users of the subset of users for which the term appears in the set of user metadata corresponding to the subset of users; and determine an affinity user score based at least in part on the first value and the second value;

machine learning logic comprising a field-aware factorization machine (FFM) model that, when executed by the one or more processors is configured to cause the one or more processors to:

randomly split a training dataset into a number of chunks, wherein the training dataset comprises historical user metadata associated with a first historical time range;

iteratively train the FFM model by sequentially feeding the chunks of the training dataset into the FFM model, wherein the FFM model is configured to output updated coefficients representing correlations between behaviors and different features combinations after each training iteration;

apply the updated coefficients to a testing dataset after each training iteration, wherein the testing dataset comprises historical user metadata associated with a second historical time range different than the first historical time range;

validate the FFM model after each training iteration, wherein validating the FFM model comprises inputting the testing dataset into the FFM model and determining validation metrics to evaluate the updated coefficients based on resulting outputs of the FFM model;

terminate training of the FFM model in response to the validation metrics converging or declining across training iterations, wherein the updated coefficients associated with the highest validation metrics are retained and utilized by the trained and validated FFM model;

identify correlations between a desired behavior and different feature combinations based on the trained and validated FFM model;

convert the set of user metadata into a set of features; and determine, via the trained and validated FFM model, a machine-learning user score based at least in part on a comparison between the different feature combinations and the set of features, wherein each feature of the set of features is assigned a dynamic weight based on one or more attributes of the user metadata forming the respective feature, and the dynamic weight corresponds to an amount of influence the respective feature has on the machine-learning user score; and presentation logic that, when executed by the one or more processors is configured to cause the one or more processors to:

provide targeted content associated with the piece of digital content to one or more electronic devices associated with the at least one user when the affinity user score, the machine-learning user score, or both are below respective upper threshold values and above respective lower threshold values; and exclude the one or more electronic devices from receiving the targeted content when the affinity user score and the machine-learning user score are outside respective predetermined ranges defined by the respective upper threshold values and the respective lower threshold values.

2. The cloud services system of claim 1, wherein the machine learning logic comprises a data processing pipeline configured to iteratively, at a periodic cadence, sample the set of user metadata and assemble the sample of the set of user metadata into the training dataset and the testing dataset for training and validation of the FFM model.

3. The cloud services system of claim 2, wherein the data processing pipeline samples the set of user metadata by gathering positive and negative interaction data representations associated with the group of users.

4. The cloud services system of claim 2, wherein the data processing pipeline assembles the sample of the set of user metadata into the training dataset by refreshing first affinity characteristics with respect to the first historical time range for training the FFM model, and assembles the sample of the set of user metadata into the training dataset by refreshing second affinity characteristics with respect to the second historical time range for validation of the FFM model.

5. The cloud services system of claim 4, wherein the first historical time range is the last 5 years and the second historical time range is the last 6 months.

6. The cloud services system of claim 4, wherein the data processing pipeline assembles the sample of the set of user metadata, by:
- extracting from the sample, watch/purchase history and demographics of the group of users; and
- generating merged and formatted customer data, by merging the watch/purchase history and demographics of the group of users with the first affinity characteristics and the second affinity characteristics.

7. The cloud services system of claim 6, wherein the data processing pipeline assembles the sample of the set of user metadata, by:
- identifying an indication of metadata characteristics associated with the piece of digital content; and
- joining and formatting the indication of the metadata characteristics with the merged and formatted customer data into a FFM format.

8. The cloud services system of claim 7, wherein the machine learning logic is configured to:
- identify, from the FFM format, the set of features;
- input the set of features into the FFM model; and
- train the FFM model using the inputted set of features.

9. The cloud services system of claim 1, wherein the prediction logic, when executed by the one or more processors, is configured to cause the one or more processors to determine the subset of users based at least in part on a first range of total interactions with content, a second range of total number of terms in the set of user metadata corresponding to each user of the subset of users, or both.

10. The cloud services system of claim 1, wherein each appearance of the first total of appearances and the second total of appearances is multiplied by a weight value, and the weight value is based at least in part on a type of the appearance, an age of the appearance, or both.

11. A computer-implemented method, comprising:
- receiving a set of user metadata for a group of users, the user metadata comprising data relating to user browsing history, purchase history, term usage history, social media posts and actions, location information, or a combination thereof;
- identifying a subset of users of the group of users, wherein the subset of users share a common attribute found in the set of user metadata;
- selecting at least one user from the subset of users;
- selecting a term from a category of terms related to a piece of digital content;
- determining a first value by comparing a first total of appearances of the term and a second total of appearances of all terms from the category of terms within the set of user metadata corresponding to the at least one user;
- determining a second value for the subset of users by determining a portion of users of the subset of users for which the term appears in the set of user metadata corresponding to the subset of users;
- determining an affinity user score based at least in part on the first value and the second value;
- randomly splitting a training dataset into a number of chunks, wherein the training dataset comprises historical user metadata associated with a first historical time range;
- iteratively training a field-aware factorization machine (FFM) model by sequentially feeding the chunks of the training dataset into the FFM model;
- applying updated coefficients to a testing dataset after each training iteration, wherein the testing dataset comprises historical user metadata associated with a second historical time range different than the first historical time range and the updated coefficients represent correlations between behaviors and different feature combinations;
- validating the FFM model after each training iteration, wherein validating the FFM model comprises inputting the testing dataset into the FFM model and determining validation metrics to evaluate the updated coefficients based on resulting outputs of the FFM model;
- terminating training of the FFM model in response to the validation metrics converging of declining across training iterations, wherein the updated coefficients associated with the highest validation metrics are retained and utilized by the trained and validated FFM model;
- determining, via the trained and validated FFM model, correlations between a desired behavior and different feature combinations;
- converting the set of user metadata into a set of features;
- determining, via the trained and validated FFM model, a machine-learning user score based at least in part on a comparison between the different feature combinations and the set of features, wherein each feature of the set of features is assigned a dynamic weight based on one or more attributes of the user metadata forming the respective feature, and the dynamic weight corresponds to an amount of influence the respective feature has on the machine-learning user score; and
- providing the affinity user score and the machine-learning user score to presentation logic to cause the presentation logic to provision targeted content associated with the piece of digital content to one or more electronic devices associated with the at least one user based on the affinity user score and the machine-learning user score, wherein the presentation logic is configured to provide the targeted content to the one or more electronic devices when the affinity user score, the machine-learning user score, or both are below respective upper threshold values and above respective lower threshold values, and exclude the one or more electronic devices from receiving the targeted content when the affinity user score and the machine-learning user score are outside respective predetermined ranges defined by the respective upper threshold values and the respective lower threshold values.

12. The computer-implemented method of claim 11, comprising:
- iteratively, at a periodic cadence:
  - sampling the set of user metadata by gathering positive and negative interaction data representations associated with the group of users, and assembling the sample of the set of user metadata into the training dataset and the testing dataset for training and validation of the FFM model by refreshing first affinity characteristics with respect to the first historical time range for training the FFM model, and refreshing second affinity characteristics with respect to the second historical time range for validation of the FFM model.

13. The computer-implemented method of claim 12, comprising:
assembling the sample of the set of user metadata, by:
extracting from the sample, watch/purchase history and demographics of the group of users; and
generating merged and formatted customer data, by merging the watch/purchase history and demographics of the group of users with the first affinity characteristics and the second affinity characteristics.

14. The computer-implemented method of claim 13, comprising:
assembling the sample of the set of user metadata, by:
identifying an indication of metadata characteristics associated with the piece of digital content; and
joining and formatting the indication of metadata characteristics with the merged and formatted customer data into a FFM format.

15. The computer-implemented method of claim 14, comprising:
identifying, from the FFM format, the set of features;
inputting the set of features into the FFM model; and
training the FFM model using the inputted set of features.

16. The computer-implemented method of claim 11, comprising:
determining the subset of users based at least in part on a first range of total interactions with content, a second range of total number of terms in the set of user metadata corresponding to each user of the subset of users, or both.

17. A non-transitory, computer-readable medium, comprising computer-readable instructions that, when executed by one or more processors of one or more computers, cause the one or more computers to:
receive a set of user metadata for a group of users, the user metadata comprising data relating to user browsing history, purchase history, term usage history, social media posts and actions, location information, or a combination thereof;
identify a subset of users of the group of users, wherein the subset of users share a common attribute found in the set of user metadata;
select at least one user from the subset of users;
select a term from a category of terms related to a piece of digital content;
determine a first value by comparing a first total of appearances of the term and a second total of appearances of all terms from the category of terms within the set of user metadata corresponding to the at least one user;
determine a second value for the subset of users by determining a portion of users of the subset of users for which the term appears in the set of user metadata corresponding to the subset of users;
determine an affinity user score based at least in part on the first value and the second value;
randomly split a training dataset into a number of chunks, wherein the training dataset comprises historical user metadata associated with a first historical time range;
iteratively train a field-aware factorization machine (FFM) model by sequentially feeding the chunks of the training dataset into the FFM model;
apply updated coefficients to a testing dataset after each training iteration, wherein the testing dataset comprises historical user metadata associated with a second historical time range different than the first historical time range and the updated coefficients represent correlations between behaviors and different feature combinations;
validate the FFM model after each training iteration, wherein validating the FFM model comprises inputting the testing dataset into the FFM model and determining validation metrics to evaluate the updated coefficients based on resulting outputs of the FFM model;
terminate training of the FFM model in response to the validation metrics converging or declining across training iterations, wherein the updated coefficients associated with the highest validation metrics are retained and utilized by the trained and validated FFM model;
determine, via the trained and validated FFM model, correlations between a desired behavior and different feature combinations;
convert the set of user metadata into a set of features;
determine, via the trained and validated FFM model, a machine-learning user score based at least in part on a comparison between the different feature combinations and the set of features, wherein each feature of the set of features is assigned a dynamic weight based on one or more attributes of the user metadata forming the respective feature, and the dynamic weight corresponds to an amount of influence the respective feature has on the machine-learning user score; and
provide the affinity user score and the machine-learning user score to presentation logic to cause the presentation logic to provision targeted content associated with the piece of digital content to one or more electronic devices associated with the at least one user based on the affinity user score and the machine-learning user score, wherein the presentation logic is configured to provide the targeted content to the one or more electronic devices when the affinity user score, the machine-learning score, or both are below respective upper threshold values and above respective lower threshold values, and exclude the one or more electronic devices from receiving the targeted content when the affinity user score and the machine-learning user score are outside respective predetermined ranges defined by the respective upper threshold values and the respective lower threshold values.

18. The cloud services system of claim 1, wherein the presentation logic is configured to cause the one or more processors to add the targeted content to a queue associated with the one or more electronic devices when the affinity user score, the machine-learning user score, or both are below the respective upper threshold values and above the respective lower threshold values to cause the one or more electronic devices to display the targeted content to the at least one user in response to the at least one user opening a particular application.

* * * * *